US011292067B2

(12) United States Patent
Street et al.

(10) Patent No.: US 11,292,067 B2
(45) Date of Patent: Apr. 5, 2022

(54) HANDHELD PUNCH TOOL

(71) Applicant: MILWAUKEE ELECTRIC TOOL CORPORATION, Brookfield, WI (US)

(72) Inventors: William E. Street, Richfield, WI (US); James Wekwert, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 86 days.

(21) Appl. No.: 16/054,343

(22) Filed: Aug. 3, 2018

(65) Prior Publication Data
US 2019/0039155 A1 Feb. 7, 2019

Related U.S. Application Data

(60) Provisional application No. 62/541,165, filed on Aug. 4, 2017.

(51) Int. Cl.
*B23D 27/04* (2006.01)
*B21D 28/26* (2006.01)
(Continued)

(52) U.S. Cl.
CPC ............. *B23D 27/04* (2013.01); *B21D 28/26* (2013.01); *B23D 15/12* (2013.01); *B21D 28/12* (2013.01)

(58) Field of Classification Search
CPC ............ B23D 27/00–06; B23D 29/005; B23D 29/026; B23D 15/12; B21D 28/12; B21D 28/26; B21D 28/343; B21D 28/02; B21D 28/002; B21D 28/14; B21D 28/20; B21D 37/06; Y10S 83/916; Y10S 83/917; B26F 2001/3886; B23Q 11/0071; Y10T 83/9444
(Continued)

(56) References Cited

U.S. PATENT DOCUMENTS

| 2,318,982 A | 5/1943 | Wilhide |
| 3,029,510 A | 4/1962 | Marden, Jr. |

(Continued)

FOREIGN PATENT DOCUMENTS

| DE | 19858834 C1 | 3/2000 |
| EP | 0363864 A2 | 4/1990 |

(Continued)

OTHER PUBLICATIONS

International Search Report and Written Opinion for Application No. PCT/US2018/045161 dated Dec. 7, 2018, 15 pages.

*Primary Examiner* — Ghassem Alie
*Assistant Examiner* — Samuel A Davies
(74) *Attorney, Agent, or Firm* — Michael Best & Friedrich LLP

(57) ABSTRACT

A handheld punch tool includes a housing defining a first axis, a motor contained within the housing, the motor having a motor shaft defining a second axis, and a head coupled to the housing and rotatable relative to the housing about a third axis. The head includes a drive member reciprocable along the third axis in response to rotation of the motor shaft about the second axis and a punch coupled to the drive member and reciprocable along a fourth axis in response to reciprocation of the drive member along the third axis. The third axis is perpendicular to the first axis, and the fourth axis is parallel to the third axis such that rotation of the head about the third axis varies a position of the punch relative to the housing.

17 Claims, 4 Drawing Sheets

(51) Int. Cl.
*B23D 15/12* (2006.01)
*B21D 28/12* (2006.01)

(58) Field of Classification Search
USPC .... 83/916, 693, 694; 30/228, 241–243, 358, 30/360, 362, 366, 182, 341
See application file for complete search history.

(56) References Cited

U.S. PATENT DOCUMENTS

| | | | | |
|---|---|---|---|---|
| 3,340,610 A | * | 9/1967 | Hendrickson | B23D 27/02 30/123 |
| 3,412,466 A | * | 11/1968 | Kurosaki | B23D 29/00 30/228 |
| 3,940,852 A | * | 3/1976 | Ruf | B23D 27/02 30/241 |
| 3,942,250 A | * | 3/1976 | Kurosaki | B23D 27/02 30/241 |
| 4,047,457 A | * | 9/1977 | Stubbings | B23D 33/04 83/76.8 |
| 4,281,459 A | * | 8/1981 | Krieg | B23D 27/00 30/228 |
| 4,299,004 A | | 11/1981 | Lancaster | |
| 4,312,256 A | | 1/1982 | Herzog et al. | |
| 4,361,957 A | | 12/1982 | Krotz et al. | |
| 4,516,456 A | * | 5/1985 | Dorosz | B21D 28/26 83/565 |
| 4,748,744 A | | 6/1988 | Turner | |
| 5,044,080 A | | 9/1991 | Keller et al. | |
| 5,170,560 A | | 12/1992 | Allemann et al. | |
| 5,640,770 A | * | 6/1997 | Fowler | A45D 29/023 30/29 |
| 5,957,946 A | * | 9/1999 | Shuler | A61B 17/16 30/366 |
| 6,442,847 B1 | * | 9/2002 | Chen | B21D 19/08 30/228 |
| 7,225,711 B2 | | 6/2007 | Strong | |
| 7,281,886 B2 | * | 10/2007 | Stoerig | B23Q 11/0046 175/213 |
| 7,685,798 B2 | * | 3/2010 | Marzocchi | B65B 5/103 53/453 |
| 7,913,403 B1 | * | 3/2011 | Willetts | A01G 3/08 30/166.3 |
| 8,683,704 B2 | * | 4/2014 | Scott | B23D 17/02 30/228 |
| 8,783,147 B2 | | 7/2014 | Turner | |
| 2004/0060415 A1 | * | 4/2004 | Wu | B23D 27/02 83/693 |
| 2008/0201961 A1 | | 8/2008 | Wu et al. | |
| 2010/0170538 A1 | * | 7/2010 | Baker | B25F 5/02 134/18 |
| 2016/0228936 A1 | | 8/2016 | Villeneuve et al. | |

FOREIGN PATENT DOCUMENTS

| | | | |
|---|---|---|---|
| EP | 0861701 A1 | 9/1998 | |
| GB | 2070493 | 9/1981 | |
| JP | 58149120 A | * 9/1983 | B23D 27/00 |
| JP | 2016129911 A | 7/2016 | |

* cited by examiner

HANDHELD PUNCH TOOL

CROSS-REFERENCE TO RELATED APPLICATIONS

This application claims priority to U.S. Provisional Patent Application No. 62/541,165, filed on Aug. 4, 2017, the entire content of which is incorporated herein by reference.

FIELD OF THE INVENTION

The present invention relates to power tools, and more specifically to handheld punch tools.

BACKGROUND OF THE INVENTION

Handheld reciprocating punch tools, also known as nibblers, operate by rapidly reciprocating a punch to cut through sheet metal, such as ductwork. Although nibblers are generally efficient and accurate tools for cutting through sheet metal, typical nibblers eject numerous small fragments during a cutting operation. These fragments can be sharp and difficult to clean up. In addition, typical nibblers are powered by an AC power source or compressed air, requiring a power cord or air hose that limits access and maneuverability. Finally, typical nibblers can only begin a cut on an edge. In other words, typical nibblers are not able to begin a cut in the middle of a sheet or on a closed duct, for example.

SUMMARY OF THE INVENTION

The present invention provides, in one aspect, a handheld punch tool including a housing defining a first axis, a motor contained within the housing, the motor having a motor shaft defining a second axis, and a head coupled to the housing and rotatable relative to the housing about a third axis. The head includes a drive member reciprocable along the third axis in response to rotation of the motor shaft about the second axis and a punch coupled to the drive member and reciprocable along a fourth axis in response to reciprocation of the drive member along the third axis. The third axis is perpendicular to the first axis, and the fourth axis is parallel to the third axis such that rotation of the head about the third axis varies a position of the punch relative to the housing.

The present invention provides, in another aspect, a handheld punch tool comprising including a housing defining a first axis, a motor contained within the housing, the motor having a motor shaft defining a second axis, and a head coupled to the housing. The head includes a drive member reciprocable along a third axis in response to rotation of the motor shaft about the second axis and a punch coupled to the drive member and reciprocable in response to reciprocation of the drive member along the third axis. The handheld punch tool also includes a debris collection container removably coupled to the head. The debris collection container is configured to receive chips generated during operation of the handheld punch tool.

The present invention provides, in another aspect, a handheld punch tool including housing defining a first axis, a motor contained within the housing, the motor having a motor shaft defining a second axis, and a head coupled to the housing. The head includes a drive member reciprocable along a third axis in response to rotation of the motor shaft about the second axis and a punch coupled to the drive member and reciprocable in response to reciprocation of the drive member along the third axis. The handheld punch tool also includes a drive assembly coupling the motor shaft to the drive member and an auxiliary cutting mechanism coupled to the drive assembly between the motor shaft and the drive member.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
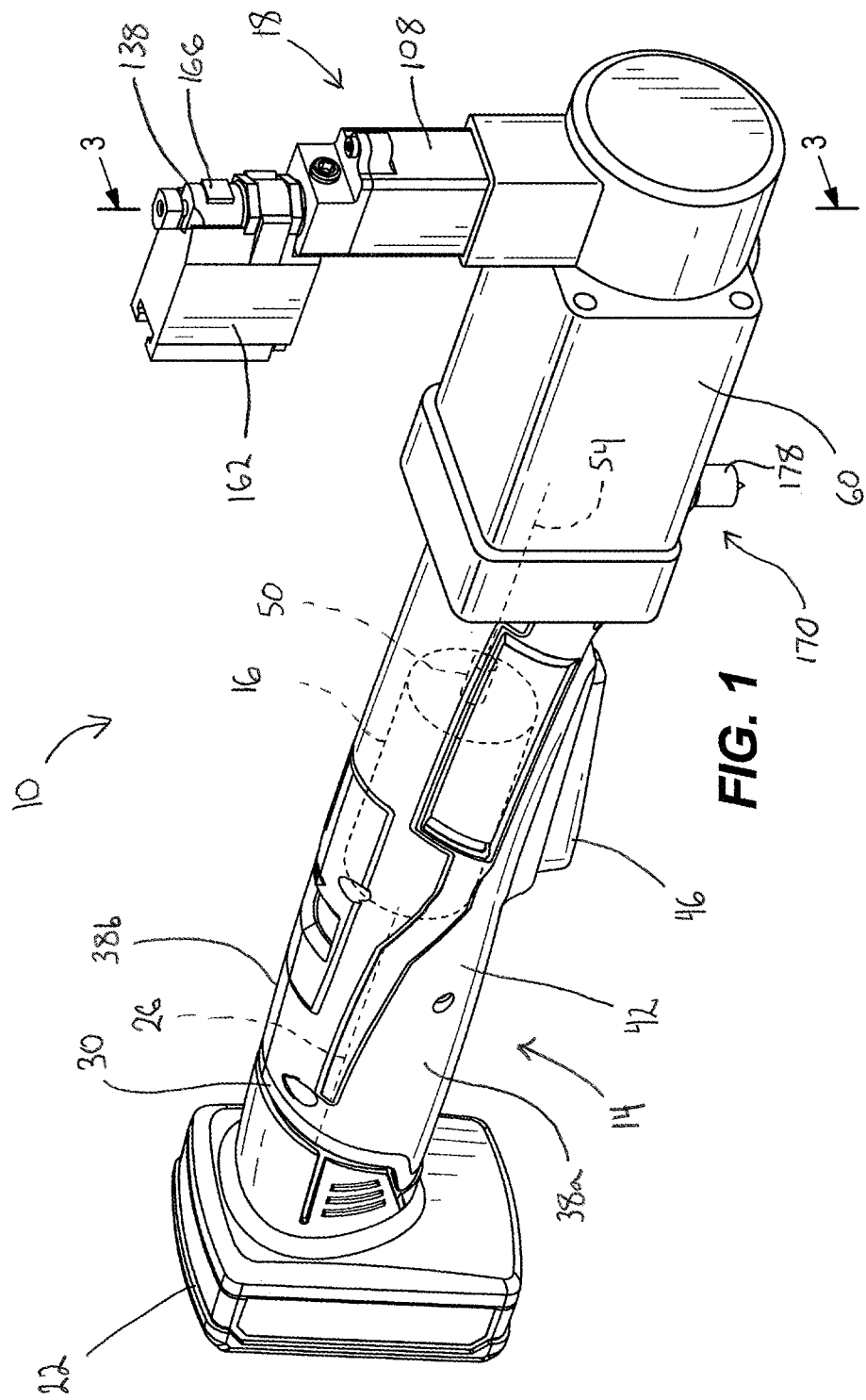
FIG. 1 is a perspective view of a punch tool according to an embodiment of the invention.

FIG. 1 illustrates a handheld punch tool or nibbler 10 including a housing 14, an electric motor 16 supported within the housing 14, a cutting head 18 coupled to a front portion of the housing 14, and a battery pack 22 for supplying power to the motor 16 for operating the cutting head 18. The illustrated battery pack 22 is a rechargeable battery pack with a plurality of lithium-based cells. The battery pack 22 may have a nominal output voltage of about 12 Volts. In other embodiments, the battery pack 22 may have other nominal output voltages (e.g., about 18 Volts or more). The features and advantages of the nibbler 10 according to the present disclosure may also be applied to corded nibblers or pneumatic nibblers, however.

With continued reference to FIG. 1, the housing 14 defines a first axis or housing axis 26, which is a longitudinal axis that extends centrally through the housing 14 along its length. The battery pack 22 is partially insertable into a battery receptacle 30 located at a rear portion of the housing 14, opposite the cutting head 18. In the illustrated embodiment, the battery pack 22 is insertable into the battery receptacle 30 along the first axis 26 to couple the battery pack 22 to the battery receptacle 30. This arrangement provides the nibbler 10 with a compact, in-line arrangement that facilitates use of the nibbler 10 in tight spaces.

The illustrated housing 14 includes first and second cooperating clamshell halves 38a, 38b that define a handle portion 42 (i.e. a portion of the housing 14 configured to be grasped by an operator during operation of the nibbler 10) having a generally cylindrical shape. The housing axis 26 extends centrally through the handle portion 42. However, the housing 14 may have a variety of other constructions such that the housing axis 26 may not extend through the handle portion 42. For example, the housing 14 may be generally 'L' or 'T' shaped with the handle portion 42 formed as a pistol grip. In such embodiments, the housing axis 26 may not extend through the handle portion 42 but rather may extend through another portion of the housing 14 containing the motor 16.

In the illustrated embodiment, an on/off switch 46 is located on the handle portion 42 for selectively electrically connecting the motor 16 and the battery pack 22 to provide DC power to the motor 16. In some embodiments, the on/off switch 46 may be a variable speed switch. The motor 16 has a motor shaft 50 that is rotatable about a second axis or motor axis 54. The motor 16 is preferably oriented such that the motor axis 54 is coaxial with the housing axis 26. As such, relationships described herein with reference to the motor axis 54 are equally applicable to the housing axis 26, and vice versa. However, it is contemplated that in other embodiments, the motor axis 54 and the housing axis 26 may not be coaxial.

Figure 3:
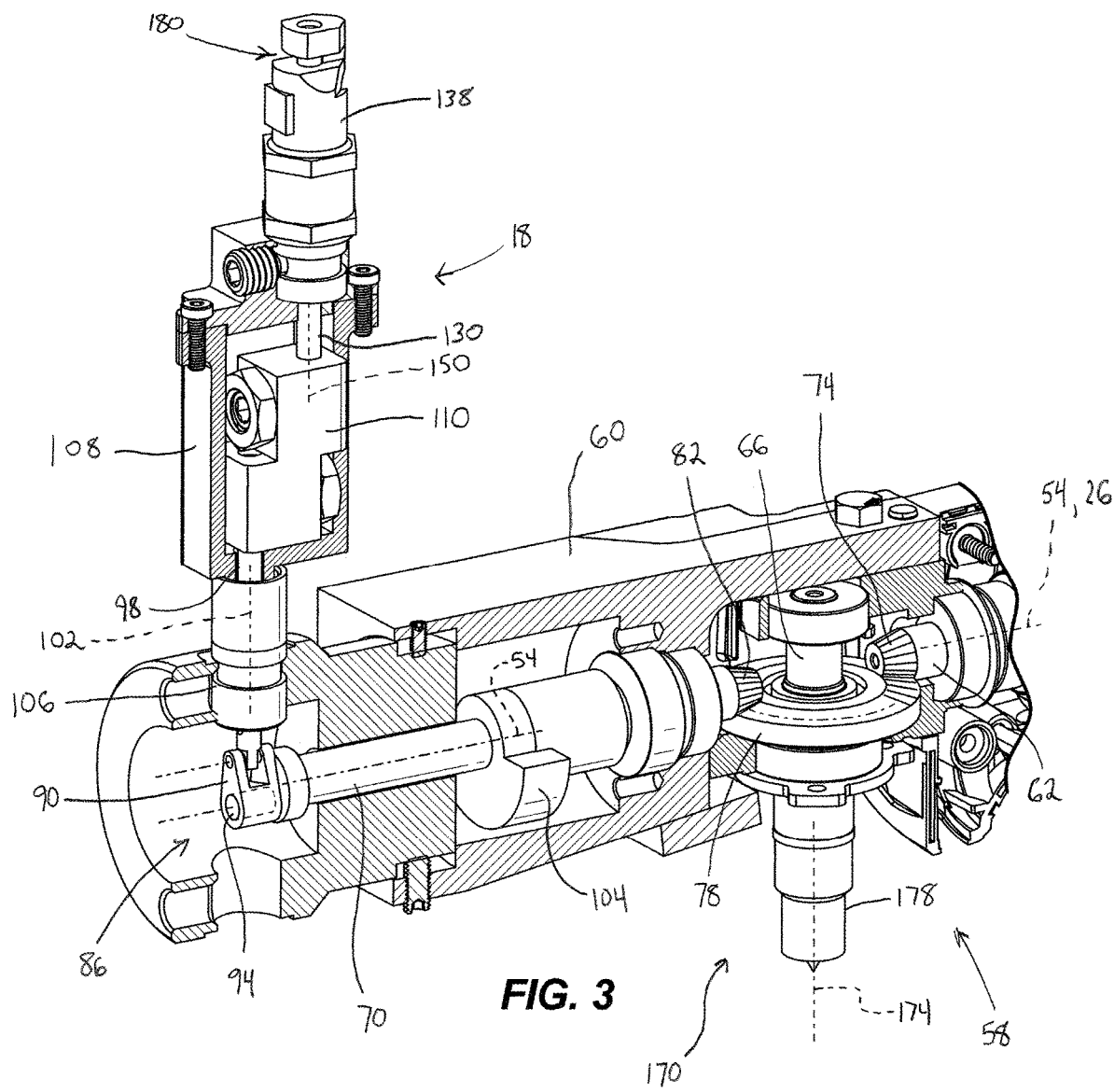
FIG. 3 is a cross-sectional view, taken along line 3-3 in FIG. 1, illustrating a drive assembly of the punch tool.

Referring to FIG. 3, the nibbler 10 also includes a drive assembly 58 positioned between the motor 16 (FIG. 1) and the cutting head 18 along the housing axis 26. The drive assembly 58 is at least partially contained within a drive housing portion 60 of the housing 14. The drive assembly 58 includes an input member or input shaft 62 that receives torque from the motor shaft 50, an intermediate member or intermediate shaft 66 driven by the input shaft 62, and an output member or output shaft 70 driven by the intermediate shaft 66. The input shaft 62 and the output shaft 70 are coaxial with the motor axis 54 in the illustrated embodiment; however, in other embodiments, the input shaft 62 and the output shaft 70 may be parallel to the motor axis 54. The intermediate shaft 66 extends transverse to the motor axis 54.

The input shaft 62 may be coupled to the motor shaft 50 via a transmission (e.g., a single or multi-stage planetary transmission; not shown) or gear reduction, or the input shaft 62 may be directly driven by the motor shaft 50. Alternatively, the input shaft 62 and the motor shaft 50 may be integrally formed together as a single component. The input shaft 62 includes an input pinion 74 meshed with an intermediate ring gear 78 that is supported on the intermediate shaft 66. The output shaft 70 includes an output pinion 82 meshed with the intermediate ring gear 78. The intermediate ring gear 78 is thus disposed between the input pinion 74 and the output pinion 82 to transmit torque from the input pinion 74 to the output pinion 82.

With continued reference to FIG. 3, the illustrated drive assembly 58 further includes an eccentric 86 for providing a reciprocating input to the cutting head 18. The eccentric 86 includes a yoke 90 pivotally coupled to the output shaft 70 by an eccentric pin 94. The opposite end of the yoke 90 is pivotally coupled to a drive member or drive rod 98 of the cutting head 18. Rotation of the output shaft 70 thus causes reciprocation of the drive rod 98 along a third axis 102. In the illustrated embodiment, the third axis 102 is transverse to the first and second axes 26, 54; however, the orientation of the third axis 102 may vary in other embodiments. A counterweight 104 is fixed to the output shaft 70 to balance radial forces on the output shaft 70 generated by the reciprocating drive rod 98. The counterweight 104 thus reduces vibration in the drive assembly 58.

Figure 2:
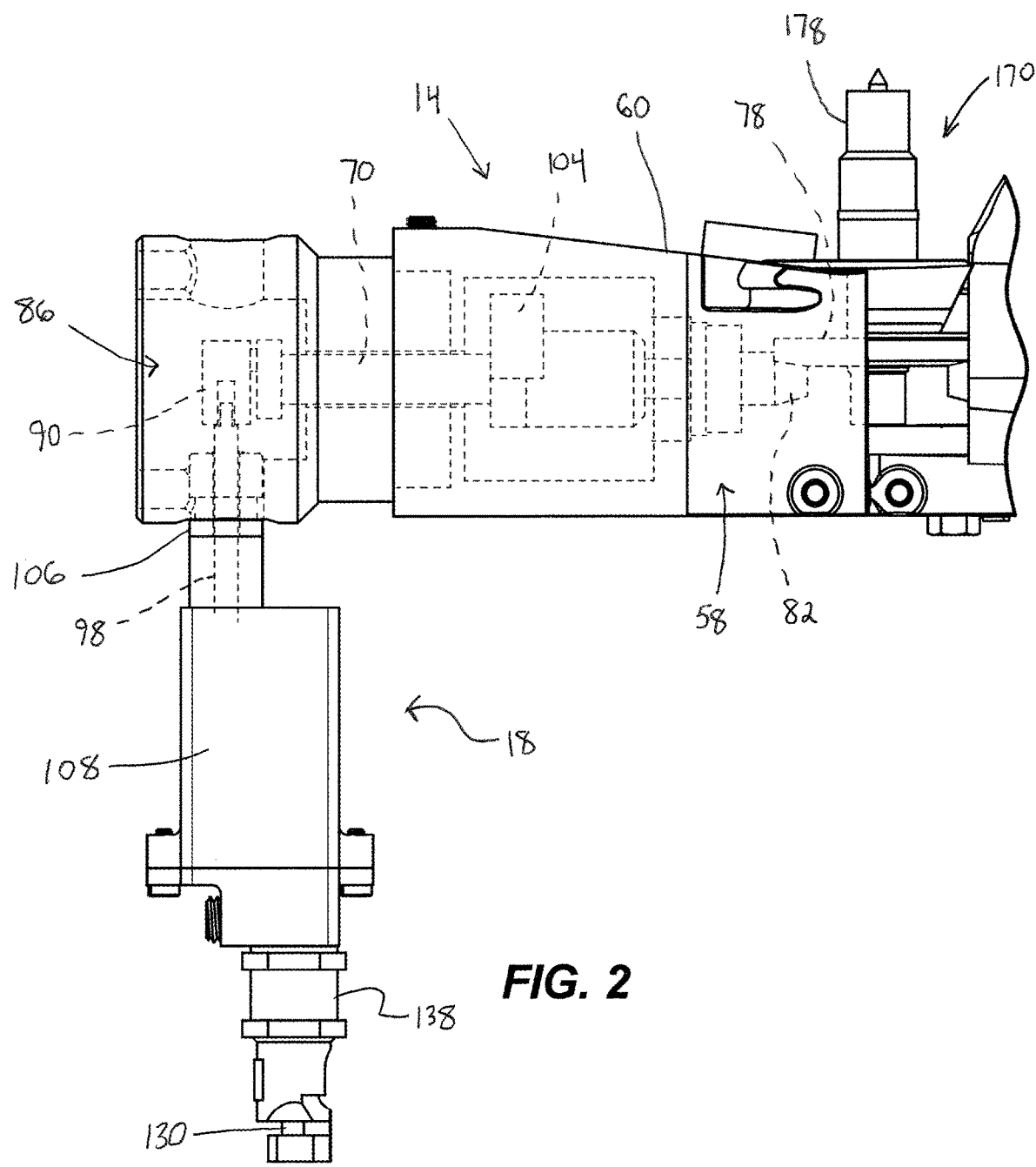
FIG. 2 is a side view illustrating a head of the punch tool of FIG. 1.

With reference to FIGS. 2 and 3, the cutting head 18 is coupled to the housing 14 by a swivel joint 106 to permit adjustment of the orientation of the cutting head 18 relative to the housing 14 about the third (swivel) axis 102, thereby making the cutting head 18 omnidirectional. In other words, the orientation of the cutting head 18 may be adjusted, while maintaining the position of the housing 14, to change the cutting direction of the cutting head 18. The perpendicular orientation of the swivel axis 102 relative to the housing axis 26 and the omnidirectional cutting head 18 advantageously allow the nibbler 10 to make more precise cuts in smaller spaces compared to typical nibblers. In addition, the nibbler 10 advantageously allows an operator to make cuts in spaces with limited access.

Figure 4:
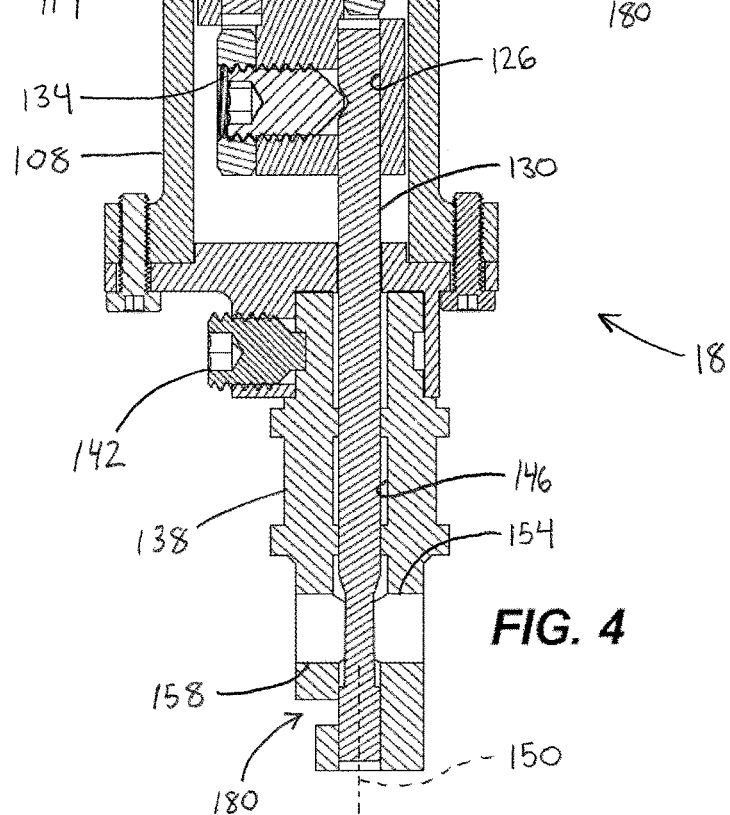
FIG. 4 is a cross-sectional view of the head of the punch tool of FIG. 1.

Referring to FIG. 4, the cutting head 18 includes a main body 108 that houses a clamp assembly 110. The clamp assembly 110 is coupled to the drive rod 98 opposite the eccentric 86. In the illustrated embodiment, the clamp assembly 110 is coupled to the drive rod 98 via a C-shaped clip 114, which is seated in a groove 118 proximate a distal end of the drive rod 98. The engagement between the C-shaped clip 114 and the groove 118 axially secures the clamp assembly 110 to the drive rod 98 while permitting the clamp assembly 110 to rotate about the drive rod 98 when the cutting head 18 is rotated relative to the housing 14 about the swivel joint 106. In the illustrated embodiment, a first set screw 122 bears against the C-shaped clip 114 to maintain the clip 114 in the groove 118. In other embodiments, the clamp assembly 110 may be coupled for reciprocation with the drive rod 98 in other ways that permit rotation of the clamp assembly 110 about the drive rod 98.

With continued reference to FIG. 4, the clamp assembly 110 includes a clamping recess 126 that receives a punch 130. A second set screw 134 secures the punch 130 within the recess 126 to removably couple the punch 130 to the clamp assembly 110. The punch 130 can thus be conveniently removed and replaced when worn, or to substitute the punch 130 for a punch having a different size or geometry. The cutting head 18 also includes a die 138 removably coupled to the main body 108 by a third set screw 142. Thus, the die 138, like the punch 130, can be conveniently removed and replaced when worn, or to substitute the die 138 for a die having a different size or geometry. The die 138 defines a passageway 146 through which the punch 130 reciprocates in response to reciprocation of the drive rod 98 and clamp assembly 110. The punch 130 is reciprocable along a fourth axis or punch axis 150 which, in the illustrated embodiment, is parallel to the third axis 102. Thus, the position of the punch axis 150 relative to the housing 14 can be adjusted by rotating the cutting head 18 about the swivel joint 106.

In some embodiments, the entirety of the clamp assembly 110 may not reciprocate with the drive rod 98. For example, the clamp assembly 110 may include a motion transfer mechanism that reciprocates the punch 130 in response to reciprocation of the drive rod 98. The motion transfer mechanism may include, for example, a first rack gear coupled to the drive rod 98, a second rack gear coupled to the punch 130, and a pinion meshed with the first rack gear and the second rack gear. In such embodiments, reciprocation of the first rack gear rotates the pinion, which in turn reciprocates the second rack gear (and the punch 130). In other embodiments, the drive rod 98 may not reciprocate but rather provide a rotational input to the cutting head 18. In such embodiments, the drive rod 98 may be driven by the output shaft 70 for rotation about the axis 102, and a reciprocation mechanism (e.g., a wobble-plate mechanism) may provided between the drive rod 98 and the punch 130.

Figure 5:
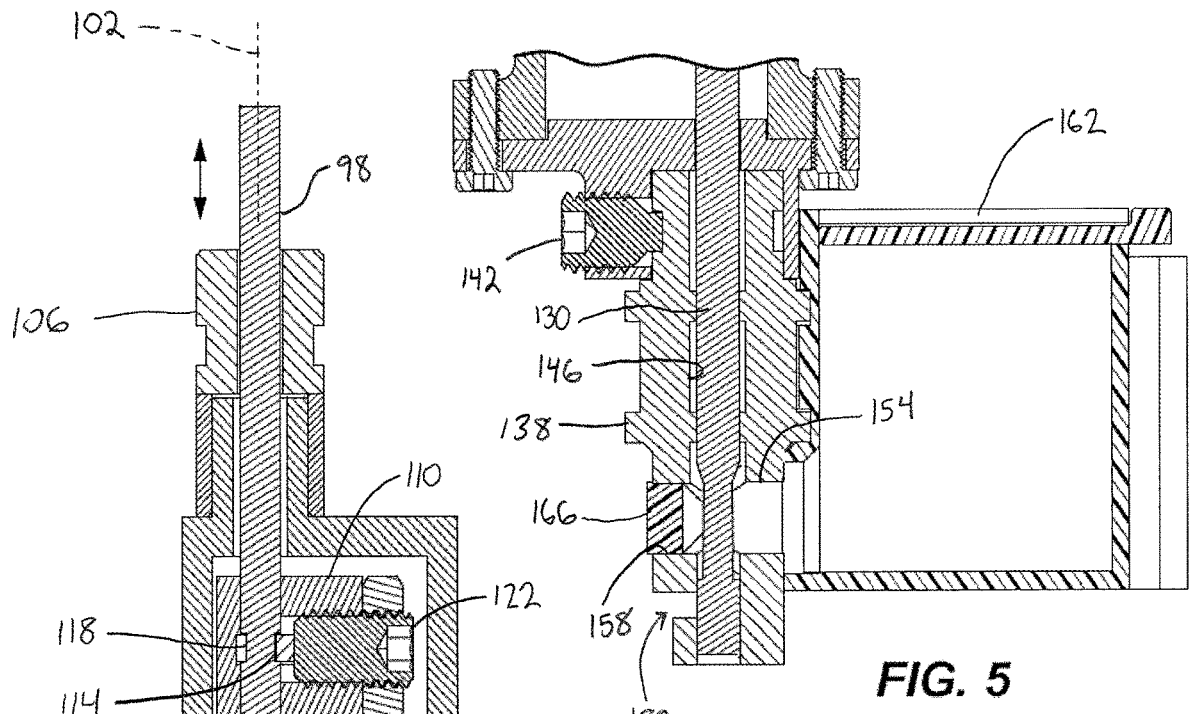
FIG. 5 is an enlarged cross-sectional view illustrating a debris collection container coupled to the head of the punch tool of FIG. 1.

With reference to FIGS. 4 and 5, the illustrated die 138 includes a first opening 154 in communication with the passageway 146 and a second opening 158 in communication with the passageway 146. Debris or chips generated during operation of the nibbler 10 can thus be ejected through either or both the first opening 154 or the second opening 158. The first and second openings 154, 158 are located on opposite sides of the die 138 in the illustrated embodiment. In other embodiments, the relative positions of the first and second openings 154, 158 may vary, one of the openings (e.g., the second opening 158) may be omitted, or more than two openings may be provided.

The nibbler 10 includes a debris collection container 162 that can be coupled to the cutting head 18 in a first position in which the debris collection container 162 receives chips ejected through the first opening 154 (FIG. 5). A removable plug 166 can be positioned in the second opening 158 to direct chips only through the first opening 154 and into the container 162. In some embodiments, the debris collection container 162 may also be coupled to the cutting head 18 in a second position (not shown) in which the debris collection container 162 receives chips ejected through the second opening 158. The plug 166 can then be positioned in the first opening 154 to direct chips only through the second opening 158. When the container 162 is coupled to the die 138 in either the first position or the second position, the container 162 swivels with the cutting head 18 about the third axis 102. In some embodiments, the container 162 can be coupled to the housing 14 rather than the cutting head 18. In some embodiments, the container 162 may include one or more magnets to attract chips into the container 162.

With reference to FIG. 3, in the illustrated embodiment, the nibbler 10 includes an auxiliary cutting mechanism 170 for cutting holes in sheet metal (e.g., an enclosed duct) or other workpieces through which the punch 130 may then be inserted. The auxiliary cutting mechanism 170 is driven by the motor 16 via the intermediate shaft 66, and the auxiliary cutting mechanism 170 is operable either in tandem with or independently from the cutting head 18. In the illustrated embodiment, the auxiliary cutting mechanism 170 extends from the handle portion 42 of the housing (between the head 18 and the battery receptacle 30; FIG. 1) and along an auxiliary cutting axis 174 (i.e. a fifth axis) that is transverse to the second axis 54 (FIG. 3). In other embodiments, the auxiliary cutting mechanism 170 may be located elsewhere on the nibbler 10. For example, the auxiliary cutting mechanism 170 may be located on the cutting head 18 (e.g., on a side opposite the punch 130 and die 138) or in front of the cutting head 18. In some embodiments, the auxiliary cutting mechanism 170 may extend from a rear portion of the housing 14 behind the motor 16. In such embodiments, the auxiliary cutting axis 174 may be coaxial with the motor axis 54 or perpendicular to the motor axis 54. In addition, the auxiliary cutting mechanism 170 may be positioned such that the auxiliary cutting axis 174 does not intersect the motor axis 54.

The auxiliary cutting mechanism 170 includes an integral or replaceable bit 178 (e.g., a stepped drill bit) having a nominal diameter larger than that of the punch 130 to create a pilot hole for the punch 130, which can then be used to create an elongated cut in the sheet metal or other workpiece. In some embodiments, a clutch mechanism (not shown) may be provided between the intermediate ring gear 78 and the intermediate shaft 66 to selectively couple the intermediate shaft 66 for co-rotation with the intermediate ring gear 78. The clutch mechanism can thus be actuated to enable or disable rotation of the auxiliary cutting mechanism 170.

In operation of the nibbler 10 in a first mode, an operator depresses the switch 46 to activate the motor 16, which continuously supplies torque to the drive assembly 58 via the motor shaft 50 and the input shaft 62 (FIGS. 1 and 3). The input pinion 74 drives the intermediate ring gear 78 for rotation about the auxiliary cutting axis 174, which in turn drives the output pinion 82 for rotation about the second axis 54 (FIG. 3). In embodiments with a clutch mechanism, the clutch mechanism is disabled in the first mode, such that rotation of the intermediate ring gear 78 is not transmitted to the intermediate shaft 66.

As the output shaft 70 rotates, the drive rod 98 of the cutting head 18 reciprocates along the third axis 102 due to the motion of the eccentric 86. The drive rod 98 reciprocates the clamp assembly 110, which in turn reciprocates the punch 130 along the punch axis 150. The operator may then guide the cutting head 18 onto a piece of sheet metal or another workpiece to be cut. As the workpiece enters a space 180 in the die 138, the reciprocating punch 130 repeatedly and incrementally shears small pieces of the workpiece against the die 138 to create an elongated cut. This generates debris or chips, which are discharged through the first opening 154 and into the debris collection container 162. By containing the chips within the collection container 162, the nibbler 10 can advantageously make cuts with less cleanup required compared to typical nibblers. If desired, the operator can rotate the cutting head 18 about the swivel axis 102 to reorient the cutting head 18. This enhances the usability of the nibbler 10 in confined spaces.

The nibbler 10 is also operable in a second mode in which the motor 16 drives the auxiliary cutting mechanism 170. In the second mode, the operator depresses the switch 46 to activate the motor 16, which continuously supplies torque to the drive assembly 58 via the motor shaft 50 and the input shaft 62 (FIGS. 1 and 3). The input pinion 74 drives the intermediate gear 78 for rotation about the auxiliary cutting axis 174. In embodiments with a clutch mechanism, the clutch mechanism is enabled in the second mode, such that rotation of the intermediate ring gear 78 is transmitted to the intermediate shaft 66. The bit 178 of the auxiliary cutting mechanism 170 co-rotates with the intermediate shaft 66. The user can then engage the rotating bit 178 with a workpiece to create a pilot hole in the workpiece. The user may then insert the cutting head 18 into the hole and operate the nibbler 10 in the first mode, as described above, to create an elongated cut from the position of the pilot hole.

Various features of the invention are set forth in the following claims.

What is claimed is:

1. A handheld punch tool comprising:
   a housing defining a first axis;
   a motor contained within the housing, the motor having a motor shaft defining a second axis;
   a drive member reciprocable along a third axis in response to rotation of the motor shaft about the second axis;
   a head coupled to the housing and rotatable relative to the housing about the third axis, the head including
      a die defining a passageway, and
      a punch coupled to the drive member and reciprocable within the passageway along a fourth axis in response to reciprocation of the drive member along the third axis,
      wherein the die includes a first opening in communication with the passageway and a second opening in communication with the passageway, the second opening and the first opening positioned on opposite sides of the fourth axis; and
   a debris collection container removably coupled to the head, the debris collection container configured to receive chips generated during operation of the handheld punch tool, wherein the debris collection container is rotatable together with the head about the third axis,
wherein the third axis is perpendicular to the first axis, and
wherein the fourth axis is parallel to the third axis such that rotation of the head about the third axis varies a position of the punch relative to the housing.

2. The handheld punch tool of claim 1,
wherein the housing includes a battery receptacle,
wherein the handheld punch tool further comprises a battery pack at least partially insertable into the battery receptacle along the first axis to couple the battery pack to the battery receptacle, and
wherein the battery back is configured to supply power to the motor.

3. The handheld punch tool of claim 1, further comprising a drive assembly coupling the motor shaft to the drive member, wherein the drive assembly is disposed axially between the motor and the head along the second axis.

4. The handheld punch tool of claim 3, wherein the head is rotatable relative to the housing between a plurality of rotational positions while the drive member is coupled to the drive assembly.

5. The handheld punch tool of claim 3, wherein the drive assembly includes:
an output member coupled to the motor shaft, and
an eccentric coupled to the output member,
wherein the eccentric is configured to reciprocate the drive member along the third axis in response to rotation of the output member.

6. The handheld punch tool of claim 1, wherein the head includes a clamp assembly coupled to the drive member via a C-shaped clip such that the clamp assembly is rotatable about the third axis relative to the drive member.

7. The handheld punch tool of claim 6, wherein the clamp assembly includes a clamping recess that receives the punch to removably couple the punch to the clamp assembly.

8. The handheld punch tool of claim 1, wherein the debris collection container is removably coupled to the head in one of a first position in which the debris collection container is configured to receive chips through the first opening, or a second position in which the debris collection container is configured to receive chips through the second opening.

9. The handheld punch tool of claim 8, further comprising a plug removably coupled to the first opening when the debris collection container is in the second position and to the second opening when the debris collection container is in the first position.

10. The handheld punch tool of claim 1, further comprising:
a drive assembly coupling the motor shaft to the drive member; and
an auxiliary cutting mechanism coupled to the drive assembly between the motor shaft and the drive member.

11. The handheld punch tool of claim 10, wherein the drive assembly includes a ring gear rotatable about a fifth axis transverse to the second axis, and wherein the auxiliary cutting mechanism is rotatable about the fifth axis in response to rotation of the ring gear.

12. The handheld punch tool of claim 11, wherein the drive assembly includes
an input member configured to receive torque from the motor shaft,
a first pinion coupled for co-rotation with the input member, the first pinion meshed with the ring gear to rotate the ring gear about the fifth axis in response to rotation of the first pinion,
an output member having an eccentric configured to reciprocate the drive member in response to rotation of the output member, and
a second pinion coupled for co-rotation with the output member, the second pinion meshed with the ring gear to rotate in response to rotation of the ring gear about the fifth axis and thereby drive the output member.

13. The handheld punch tool of claim 12, wherein the ring gear is positioned axially between the first pinion and the second pinion along the first axis.

14. The handheld punch tool of claim 10,
wherein the housing includes a battery receptacle,
wherein the handheld punch tool further comprises a battery pack at least partially insertable into the battery receptacle along the first axis to couple the battery pack to the battery receptacle, and
wherein the battery back is configured to supply power to the motor.

15. The handheld punch tool of claim 14, wherein the auxiliary cutting mechanism extends from the housing between the head and the battery receptacle.

16. A handheld punch tool comprising:
a housing defining a first axis;
a motor contained within the housing, the motor having a motor shaft defining a second axis;
a drive member reciprocable along a third axis in response to rotation of the motor shaft about the second axis;
a head coupled to the housing and rotatable relative to the housing about the third axis, the head including
a die defining a passageway, and
a punch coupled to the drive member and reciprocable within the passageway,
wherein the die includes a first opening in communication with the passageway and a second opening in communication with the passageway, the second opening and the first opening positioned on opposite sides of the passageway; and
a debris collection container configured to be removably coupled to the head in each of a first position in which the debris collection container is configured to receive chips generated during operation of the handheld punch tool through the first opening, and a second position in which the debris collection container is configured to receive chips generated during operation of the handheld punch tool through the second opening,
wherein the debris collection container is rotatable together with the head about the third axis in both the first position and the second position.

17. A handheld punch tool comprising:
a housing defining a first axis;
a motor contained within the housing, the motor having a motor shaft defining a second axis;
a drive member reciprocable along a third axis in response to rotation of the motor shaft about the second axis;
a head coupled to the housing and rotatable relative to the housing about the third axis, the head including
a die defining a passageway, and
a punch coupled to the drive member and reciprocable within the passageway,
wherein the die includes a first opening in communication with the passageway and a second opening in communication with the passageway, the second opening and the first opening positioned on opposite sides of the passageway;
a debris collection container configured to be removably coupled to the head in each of a first position in which the debris collection container is configured to receive chips generated during operation of the handheld punch tool through the first opening, and a second position in which the debris collection container is configured to receive chips generated during operation of the handheld punch tool through the second opening; and a plug configured to be removably coupled to the first opening when the debris collection container is in the second position and to the second opening when the debris collection container is in the first position.

* * * * *